United States Patent [19]
Barry

[11] Patent Number: 5,404,967
[45] Date of Patent: Apr. 11, 1995

[54] EXTRUDING DEVICE

[76] Inventor: Hubert M. Barry, 2409 - 10A Avenue South, Lethbridge, Alberta, Canada, T1K 0G3

[21] Appl. No.: 60,834

[22] Filed: May 14, 1993

[51] Int. Cl.⁶ .............................................. F01M 11/04
[52] U.S. Cl. ................................ 184/105.2; 184/105.1; 222/333
[58] Field of Search ................. 184/105.2, 31, 32; 222/333, 135, 147

[56] References Cited

U.S. PATENT DOCUMENTS

| | | | |
|---|---|---|---|
| 2,626,085 | 1/1953 | MacKinnon | 222/333 |
| 2,928,574 | 3/1960 | Wagner | 222/333 |
| 4,257,540 | 3/1981 | Wegmann et al. | 184/105.2 |
| 5,105,912 | 4/1992 | Heister | 222/333 |

FOREIGN PATENT DOCUMENTS

| | | | |
|---|---|---|---|
| 0536119 | 3/1955 | Belgium | 222/333 |
| 0467374 | 8/1950 | Canada | 222/333 |
| 1210199 | 10/1970 | United Kingdom | 184/105.2 |

OTHER PUBLICATIONS

Lincoln Product Bulletin "Pistol Grip Grease Gun", Copyright 1987, printed in U.S.A.

Primary Examiner—Thomas E. Denion
Attorney, Agent, or Firm—John R. Uren

[57] ABSTRACT

A grease gun used to provide grease to a fitting. A first and second piston are reciprocated with respective passageways by an electric motor and act to press grease through the passageways into the fitting. The electric motor rotates a cam and the cam, in turn, moves a drive pin which is connected to the pistons through a piston block to provide the reciprocal motion. Single handed operation of the grease gun is possible after connecting it to the fitting.

7 Claims, 3 Drawing Sheets

EXTRUDING DEVICE

This invention relates to an extruding system and, more particularly, to an extruding system for a grease gun which grease gun may be used in a one handed operation and which is conveniently electrically powered.

BACKGROUND OF THE INVENTION

Grease guns are used, as is well known, to provide grease to an appropriate fitting which, in turn, conveys the grease to a bearing or other movable part which is to be lubricated. The fitting generally has a one-way valve in order to allow ingress of the grease and to retain the grease in the fitting after it has been provided to the fitting by the grease gun.

Typically, such grease guns are manually operated. That is, following attachment of the hose to the fitting, the handle of the gun is manually operated while holding the cartridge housing in the other hand. Thus, a two-handed operation is necessary to force the grease from the gun to the fitting. Such two-handed operation can be inconvenient.

A further inconvenience with present grease guns and other extrusion devices is that air can be trapped in the piston bore which forces the grease through the one-way valve, which valve usually is a check valve retained on a shoulder in a passageway by the use of a compression spring downstream from the flow. In the event that air is trapped in the passageway, it is necessary to use a bleed valve to remove the air in order to continue operating the apparatus. This, too, can be inconvenient since a further operation to open the bleed valve is required.

SUMMARY OF THE INVENTION

According to one aspect of the invention, there is provided an extruding apparatus to extrude fluid, said apparatus comprising a housing, a source of fluid in said housing, a first passageway extending from said source of fluid in said housing to a second passageway in said housing and a first piston reciprocal within said second passageway, said first piston being reciprocated within said second passageway by a cam surface.

According to a further aspect of the invention, there is a grease gun used to provide grease to a fitting, said grease gun comprising a cartridge housing, a cartridge operable to be positioned in said cartridge housing, a first passageway extending from said cartridge when said cartridge is positioned in said housing to second and third passageways and a piston for reciprocal movement in each of said second and third passageways.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
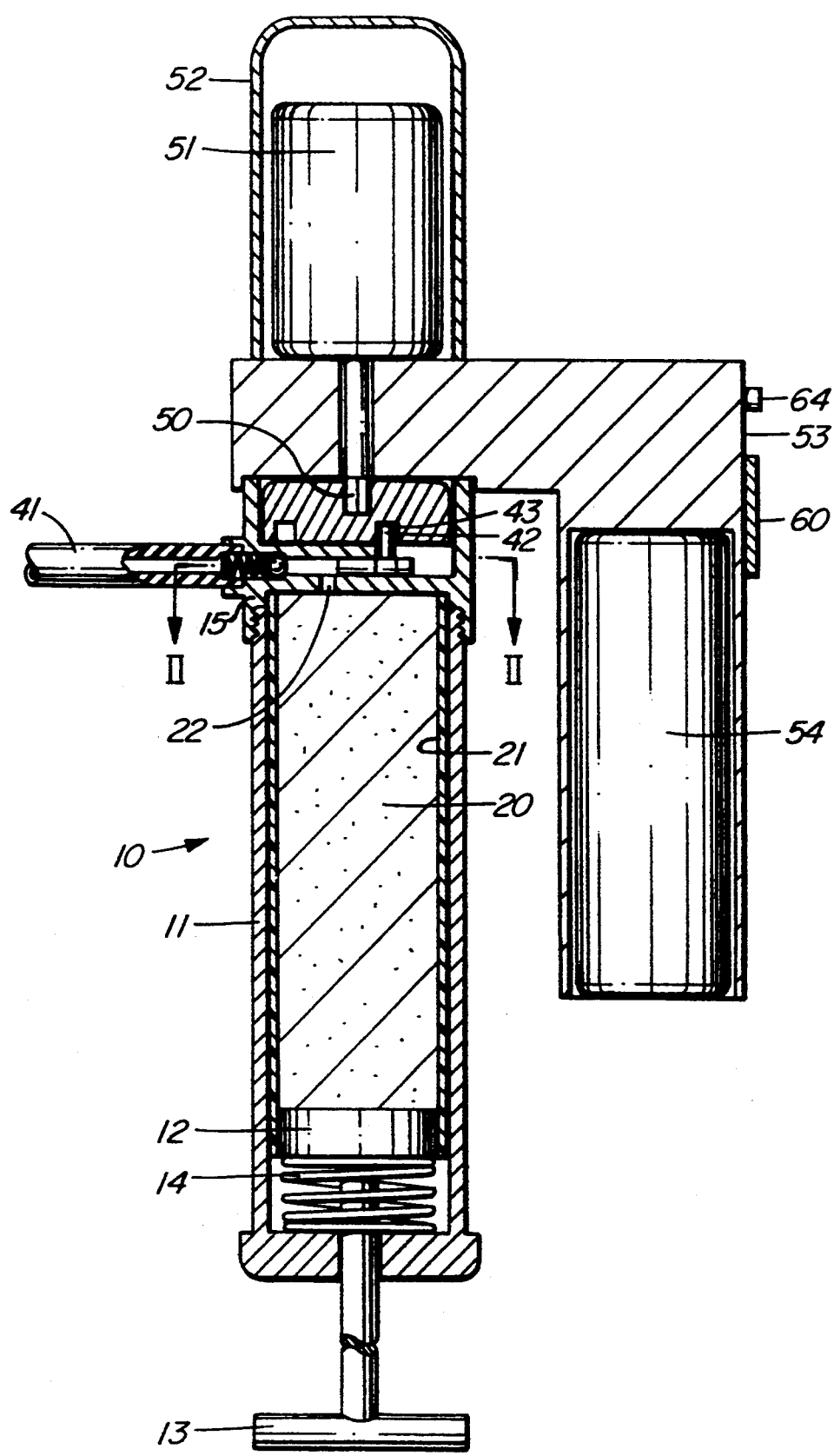
FIG. 1 is a diagrammatic sectional view of a grease gun according to the invention and illustrating a grease cartridge mounted therein.
Figure 3:
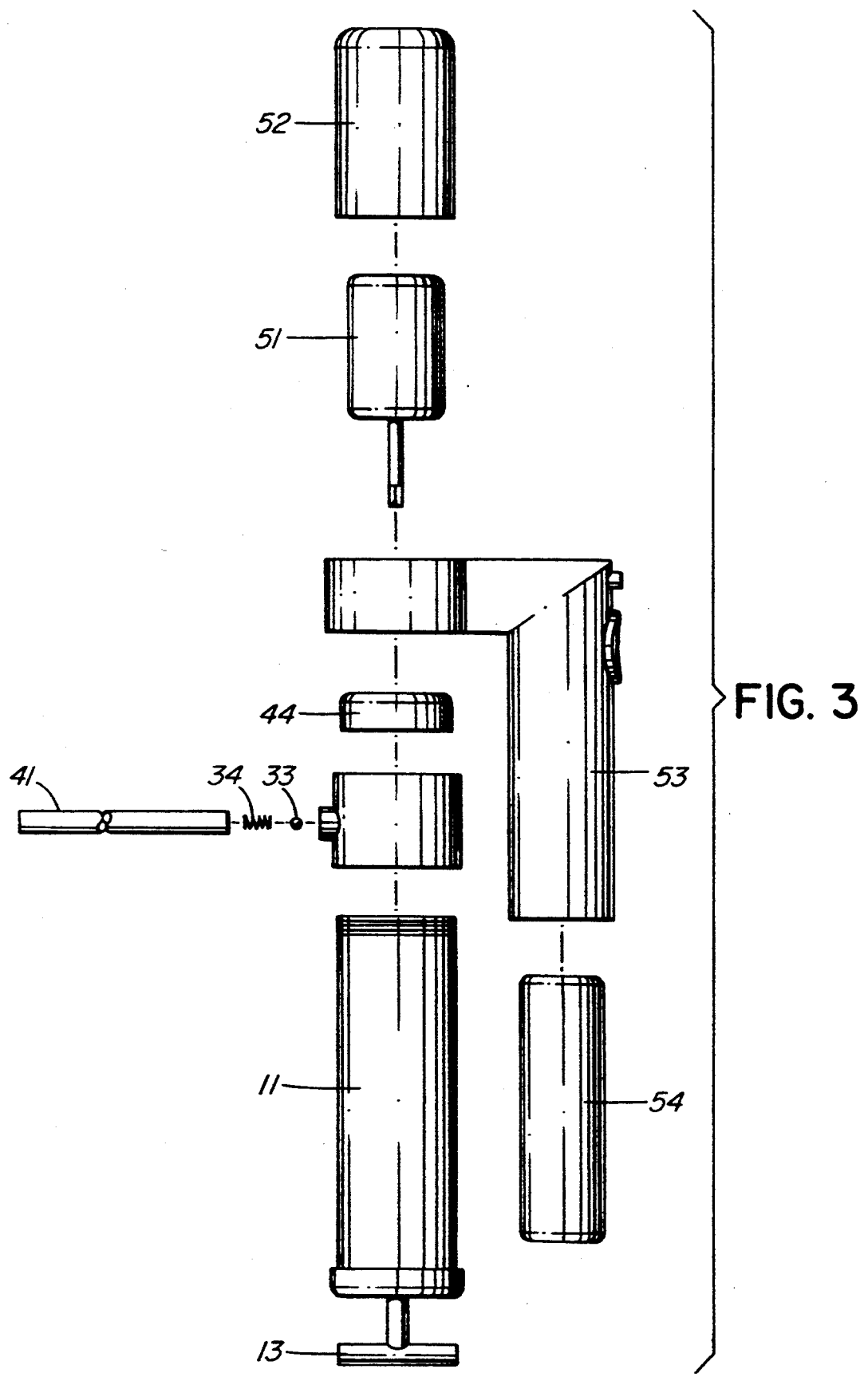
FIG. 3 is an exploded diagrammatic view of the components of the grease gun.

Referring now to the drawings, a grease gun which conveniently incorporates the invention is generally illustrated at 10 in FIG. 1 and in exploded component form in FIG. 3. The grease gun 10 includes a cartridge housing 11 removable from a valve/piston body 15. The grease gun 10 further includes a plunger 12 which is movable within housing 11, a handle 13 to move the plunger 12 and a compression spring 14 mounted between the cartridge housing 11 and plunger 12 in order to maintain pressure on the grease 20 within the cartridge 21.

Figure 2:
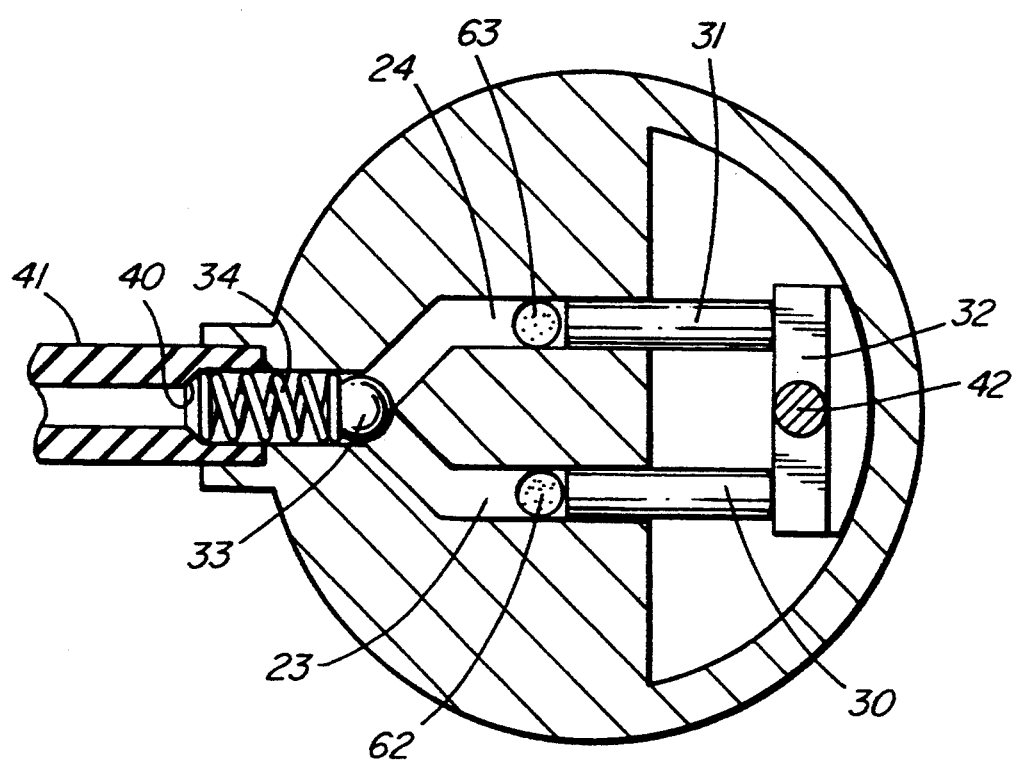
FIG. 2 is a diagrammatic sectional view taken along the line II—II of FIG. 1.

A first passageway 22 extends from the interior of the cartridge housing 11 and communicates between grease cartridge 21 and second and third passageways 23, 24 (FIG. 2).

First and second pistons 30, 31 are mounted so as to reciprocate within second and third passageways 23, 24, respectively. The first and second pistons 30, 31 are mounted to a piston mounting block 32 and the pistons 30, 31 reciprocate within second and third passageways 23, 24 respectively, by movement of the piston mounting block 32.

A check ball 33 is mounted downstream from first passageway 22 and a compression spring 34 is mounted between check ball 33 and a shoulder 40 formed in the hose 41 which is used to convey the grease 20 to the fitting (not shown).

A drive pin 42 is mounted to the piston mounting block 32 and extends from the piston mounting block to a drive groove 43 (FIG. 1) which is formed within a cam 44. Cam 44 is rotated by a shaft 50 which extends from the motor 51 operably located within a motor housing 52. A handle or main body 53 is positioned about the motor housing 52 and includes a rechargeable battery 54 which provides power to the electrical motor 51. A sliding switch 60 is mounted on the handle 53 and moves as indicated to turn the motor 51 on and off as may be desired by the operator.

OPERATION

In operation, the cartridge housing will be removed from the valve/piston body portion 15 and a grease cartridge 21 will be mounted therein with the open face being at the upper end of the housing 11. Handle 13 will have previously returned plunger 12 to the position illustrated so that the plunger 12, through the action of compression spring 14, acts to force the grease 20 within cartridge 21 into the first passageway 22.

The grease in the first passageway 22 will travel to the two ports 62, 63 which open into second and third passageways 23, 24. Ports 62, 63 will thereby allow grease to enter second and third passageways 23, 24 when the pistons 30, 31 are on their return stroke and ports 62, 63 are uncovered as illustrated.

The operator will attach the hose 41 to a fitting to be lubricated (not shown) and, thereafter, the will move the switch 60 to the ON position. The battery 54 will provide power to motor 51 which will rotate the shaft 50 and cam 44 which is driven by shaft 50. The groove 43 in cam 44 will move the drive pin 42 connected to the pistons 30, 31 through the piston mounting block 32.

As the pistons 30, 31 move towards check ball 33, they will push a predetermined quantity of grease through the passageways 23, 24, past check ball 33 and into hose 41. The appropriate amount of grease will be provided to the fitting through the hose 41.

It will be noted that in the event a certain amount of air enters passageway 23, for example, and since the air in the passageway is compressible, the check ball 33, although normally not opened by the presence of the airblock, will continue to be opened by second piston 31 which moves grease through the passage 24, past check ball 33 and into hose 41.

Conveniently, a ratchet type mechanism will provide an audible click or other sound upon every revolution of the cam 44 thereby audibly indicating to the operator the amount of grease that has been provided to the hose 41 and, therefore, to the fitting. A low indicator battery light 64 is conveniently provided to indicate when the power in the battery is low and it is intended that the battery 54 be recharged. An overload switch (not shown) will conveniently also be provided with or auxiliary to the motor 51 which will trip in the event the current running to the motor 51 exceeds a predetermined value obtained by correlating the maximum grease line pressure. This will protect against any damage to the components being greased. The overload switch conveniently is adjustable to allow for the line pressure of the extruding device to be adjustable manually.

While the grease gun according to the invention is intended to be powered by a battery which will increase portability, it is also possible, of course, to use line voltage and an extension cord running from a plug.

The extruding device, while being conveniently incorporated in a grease gun, could also be used in other applications such as caulking tools, sealing tools and food and pharmaceutical devices where a fluid is extruded from a source according to the invention.

Accordingly and although a specific embodiment of the invention has been described, such an embodiment should be considered as being illustrative of the invention only and not as limiting its scope as defined in accordance with the accompanying claims.

What is claimed is:

1. Extruding apparatus to extrude fluid said apparatus comprising a housing, a source of fluid in said housing, a first passageway extending from said source of fluid in said housing to a second and a third passageway, a first piston reciprocal within said second passageway, a second piston reciprocal within said third passageway, said first piston and said second piston being substantially parallel and moving simultaneously in the same direction to discharge said fluid from said second and third passageways.

2. Extruding apparatus as in claim 1 wherein said fluid is grease and said fluid is extruded from a grease gun to a grease fitting.

3. Extruding apparatus as in claim 2 wherein said first and second pistons are reciprocated simultaneously by a cam, said cam being powered by an electrical motor.

4. Extruding apparatus as in claim 1 wherein said fluid is caulking compound and said fluid is extruded from a caulking gun.

5. Extruding apparatus as in claim 1 wherein said fluid is sealant and said fluid is extruded from a sealing gun.

6. Extruding apparatus as in claim 1 wherein said fluid is edible.

7. Extruding apparatus as in claim 1 wherein said fluid is a pharmaceutical preparation.

* * * * *